United States Patent
Mashimo et al.

[11] Patent Number: 6,125,191
[45] Date of Patent: *Sep. 26, 2000

[54] OBJECT DETECTING SYSTEM FOR VEHICLE

[75] Inventors: Hiroshi Mashimo; Mahito Ishiyama, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/648,860

[22] Filed: May 16, 1996

[30] Foreign Application Priority Data

May 22, 1995 [JP] Japan ................................. 7-122041

[51] Int. Cl.$^7$ .............................. G06K 9/00; G08G 1/123
[52] U.S. Cl. ......................... 382/104; 340/988; 348/142
[58] Field of Search ............................. 180/169; 342/70, 342/71, 72, 118; 340/435, 933, 943, 988; 348/118, 135, 142, 148; 364/423.098, 424.033, 167.07, 174; 382/104, 106, 107, 288, 291

[56] References Cited

U.S. PATENT DOCUMENTS

| | | | |
|---|---|---|---|
| 5,006,988 | 4/1991 | Borenstein et al. | 701/25 |
| 5,111,401 | 5/1992 | Everett, Jr. et al. | 701/2 |
| 5,291,207 | 3/1994 | Kikuchi et al. | 342/70 |
| 5,321,407 | 6/1994 | Kikuchi et al. | 342/70 |

FOREIGN PATENT DOCUMENTS

4244184A1  7/1993  Germany.

*Primary Examiner*—Jon Chang
*Assistant Examiner*—Jayanti K. Patel
*Attorney, Agent, or Firm*—Arent, Fox Kintner Plotkin & Kahn

[57] ABSTRACT

An object detecting system for a vehicle detects an object based on output data from a distance sensor mounted on the vehicle. The distance sensor is capable of detecting a distance between the subject vehicle and the object along longitudinal and lateral directions of the subject vehicle. The output data from the distance sensor is associated on XY coordinates having a Y axis indicative of the longitudinal direction of the subject vehicle and an X axis indicative of the lateral direction with the respect to the subject vehicle in a coordinate developing device. The number of output data from the distance sensor which are located in a plurality of cells, defined by dividing the XY coordinates at predetermined distances in the X-axis and Y-axis directions and the XY coordinates for every cell, are output as cell information from a cell dividing device. In an object discerning device, the same labels or identifiers are assigned to the cells adjacent to one another, based on the cell information output from the cell dividing device, and barycentric position coordinates for every label are determined. Thus, it is possible to shorten the time required for a proximity determining process, while avoiding a reduction in accuracy of the coordinates of the object.

10 Claims, 5 Drawing Sheets

OBJECT DETECTING SYSTEM FOR VEHICLE

BACKGROUND OF THE INVENTION

1. Field of the Invention

The present invention relates to an object detecting system for a vehicle including a distance sensor mounted on the vehicle. The distance sensor is capable of detecting a distance between the subject vehicle and an object located ahead of the subject vehicle along longitudinal and lateral directions of the subject vehicle, based on transmission of a signal toward the object ahead of the subject vehicle and reception of a reflected signal from the object. Thus, the object is detected based on output data from the distance sensor.

2. Description of the Related Art

An object detecting system is conventionally known, for example, from Japanese Patent Application Laid-open No. 5-180933.

In the known object detecting system, however, the output data from the distance sensor are compared with one another to determine if the proximate data is the same in order to discern an object. Therefore, it is necessary to determine whether a large number of data output from the distance sensor are at positions adjacent to one another which results in a long processing period.

SUMMARY OF THE INVENTION

It is an object of the present invention to provide an object detecting system for a vehicle, wherein the processing time required for detecting the object can be shortened.

To achieve the above object, according to the present invention, there is provided an object detecting system for a vehicle including a distance sensor mounted on the vehicle. The distance sensor is capable of detecting a distance between the subject vehicle and the object, which is located ahead of the subject vehicle, along longitudinal and lateral directions of the subject vehicle, based on transmission of a signal toward the object, which is ahead of the subject vehicle, and reception of a reflected signal from the object. Thus, the object is detected based on output data from the distance sensor. The object detecting system further includes a coordinate developing device for developing the output data from the distance sensor on XY coordinates having a Y-axis indicative of a longitudinal direction and an X axis indicative of a lateral direction with respect to the subject vehicle. A cell dividing device divides the XY coordinates in the directions of the X and Y axes at predetermined distances into a plurality of cells, counts the number of the output data located in the cells and outputs the XY coordinates and the number of the data for every cell as cell information. An object discerning device affixes the same labels or identifiers to the cells adjacent to one another, based on the cell information output from the cell dividing device and determines barycentric coordinates for every label.

With such an arrangement, the data output from the distance sensor are collected together for each of the cells divided on the XY coordinates, and the proximity discernment is conducted by the comparison of the cells with one another. Thus, the same labels are affixed to the cells adjacent to one another. Therefore, it is possible to shorten the time required for the proximity discerning process, while avoiding a reduction in accuracy of the coordinates for the object.

The above and other objects, features and advantages of the invention will become apparent from the following detailed description of the preferred embodiments taken in conjunction with the accompanying drawings.

DETAILED DESCRIPTION OF THE PREFERRED EMBODIMENTS

Figure 1:
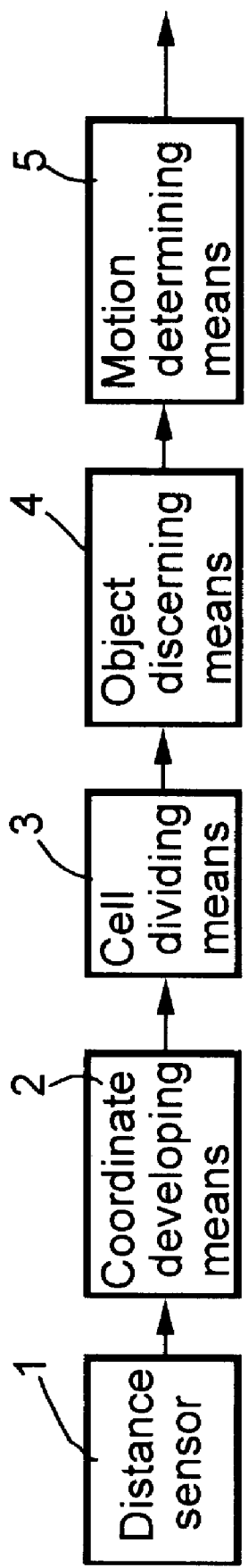
FIG. 1 is a block diagram showing the arrangement of an object detecting system for a vehicle according to a first embodiment of the present invention.

A first embodiment of the present invention will now be described with reference to FIGS. 1 to 5. Referring first to FIG. 1, a distance sensor 1 is mounted at a front portion of a vehicle (which is not shown) for detecting a distance between a subject and an object, which is located ahead of the subject vehicle, in longitudinal and lateral directions of the subject vehicle by transmitting a signal toward the object and receiving a reflected signal from the object. The distance sensor 1 is capable of detecting the distance between the subject vehicle and the object by the transmission and reception of the signal, for example, in a laser-beam scanning manner or a multi-beam manner.

Figure 2:
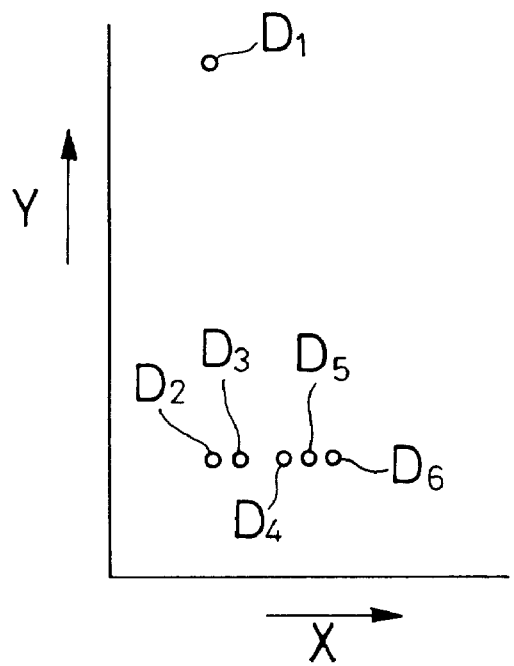
FIG. 2 is a diagram showing one example of the coordinates developed by a coordinate developing means.

Output data from the distance sensor 1 are input into a coordinate developing means 2. The coordinate developing means 2 develops or associates the output data from the distance sensor 1 on XY coordinates having a Y axis indicative of a longitudinal direction and an X axis indicative of a lateral direction with respect to the subject vehicle. For example, when six data indicated by $D_1, D_2, D_3, D_4, D_5$ and $D_6$ are input from the distance sensor 1, as shown in FIG. 2, these data $D_1$ to $D_6$ are developed or associated on the XY coordinates.

Figure 3:
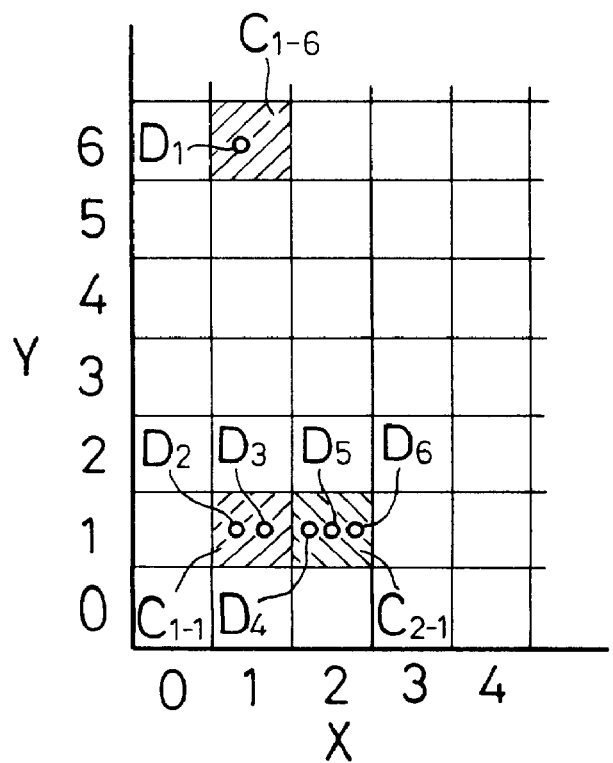
FIG. 3 is a diagram showing one example of the cell division by a cell dividing means.
Figure 4:
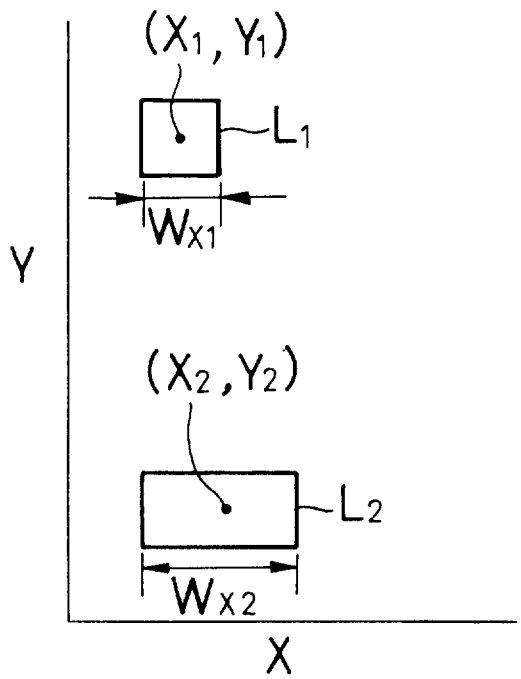
FIG. 4 is a diagram showing one example of the discernment by an object discerning means.

An output signal from the coordinate developing means 2 is input into a cell dividing means 3. In the cell dividing means 3, a plurality of cells $C_{0-0}$ to $C_{n-n}$ are established at predetermined distances in directions of the X and Y axes, as shown in FIG. 3. Cell information for each of the data $D_1$ to $D_6$ developed on the XY coordinates by the coordinate developing means 2 is established by the cell dividing means 3. For example, when the output data from the distance sensor 1 are associated with the XY coordinates, as shown in FIG. 2, data $D_1$ is located in cell $C_{1-6}$, data $D_2$ and $D_3$ are located in cell $C_{1-1}$, and data $D_4, D_5$ and $D_6$ are located in cell $C_{2-1}$. The cell dividing means 3 counts the number of output data from the distance sensor 1 which are located in each of the cells $C_{1-6}$, $C_{1-1}$ and $C_{2-1}$, and outputs the XY coordinates and the number of data for every cell $C_{1-6}$, $C_{1-1}$, $C_{2-1}$ as cell information. Specifically, if the cell information for every cell is represented as (X coordinate, Y coordinate, number of data), the cell information of the cell $C_{1-6}$ is represented as (1,6,1), the cell information of the cell $C_{1-1}$ is represented as (1,1,2), and the cell information of the cell $C_{2-1}$ is represented as (2,1,3).

The cell information from the cell dividing means 3 is input into an object discerning means 4. In the object discerning means 4, the same labels or identifiers are affixed to the cells which are adjacent to one another, based on the cell information from the cell dividing means 3. More specifically, when the cell information shown in FIG. 3 is input, an independent label $L_1$ is affixed to the cell $C_{1-6}$ in the vicinity of which no other cell having data exists. Furthermore, the same labels $L_2$ are affixed to the cells $C_{1-1}$ and $C_{2-1}$ which have data and are adjacent to each other. Moreover, barycentric coordinates and a width in the X-axis direction for every label are determined in the object discerning means 4. If discernment information is represented as (barycentric position X-coordinate, barycentric position Y-coordinate, width in X-axis direction), the discernment information of the label $L_1$ is represented as $(X_1, Y_1, Wx_1)$, and the discernment information of the label $L_2$ is represented as $(X_2, Y_2, Wx_2)$. For the label $L_1$ affixed to the cell whose cell information is identical to the cell information (1,6,1) of the cell $C_{1-6}$, $X_1=1$, and $Y_1=6$, for the labels $L_2$ affixed to both of the cells $C_{1-1}$ whose cell information is of (1,1,2) and the cell $C_{2-1}$ whose cell information is of (2,1,3), the barycentric position coordinates are determined in the following manner by dividing the sum total of the X coordinate and the Y coordinate of each data by the number of the data:

$$X_2=(1\times2+2\times3)/5=1.6$$

$$Y_2=(1\times2+1\times3)/5=1$$

Figure 5:
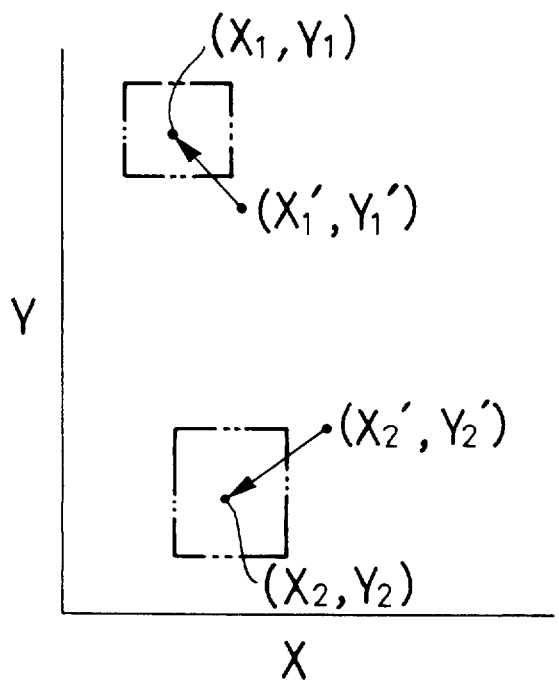
FIG. 5 is a diagram showing one example of the determination of the motion of an object by a motion determining means.

The discernment information from the object discerning means 4 is input into the motion determining means 5. The label is affixed to the object by comparison of a time series for every label discerned by the object discerning means 4. In the motion determining means 5, the relative speed of the object with respect to the subject vehicle is determined. More specifically, in each label, for example, $L_1$, $L_2$, a predicted range (shown by a dashed line) is defined ahead of a relative speed vector shown by an arrow from each of the barycentric position coordinates $(X_1', Y_1')$ and $(X_2', Y_2')$ which have been obtained last time, as shown in FIG. 5. If barycentric position coordinates $(X_1, Y_1)$ and $(X_2, Y_2)$, which have been obtained this time, exist within the predicted ranges, respectively, these data are determined as the same object, and the relative speed of the object in the X- and Y-axis directions relative to the subject vehicle is determined by the comparison of the barycentric position coordinates obtained last time and this time with each other.

In this manner, the barycentric position X-coordinate, barycentric position Y-coordinate and width in X-axis direction determined for every label by the object discerning means 4 and the relative speed determined for every label by the motion determining means 5 can be obtained as information about the object located ahead of the subject vehicle. Furthermore, a determination of a collision or the like is carried out based on such information.

The operation of the first embodiment will be described below. The data output from the distance sensor 1 are associated on XY coordinates. The cell dividing means 3 divides the XY coordinates at predetermined distances into a plurality of cells. The cell dividing means 3 then counts data in each of the cells. A label is affixed by conducting a proximity discerning process based on comparison between each of the cells. Therefore, as compared with the known system in which the proximity discernment is carried out between the output data from the distance sensor 1, the time required for the proximity discerning process is shortened, because the number of the cells established by the cell dividing means 3 is remarkably small relative to the number of the output data from the distance sensor 1. Moreover, the cell dividing means 3 also outputs the number of the data existing in each of the cells as the cell information, and the number of the data can be profitably utilized for the determination of the barycentric position coordinates in the object discerning means 4. Therefore, despite the shortening of the processing time, the accuracy of the coordinates of the object is not lowered.

Figure 6:
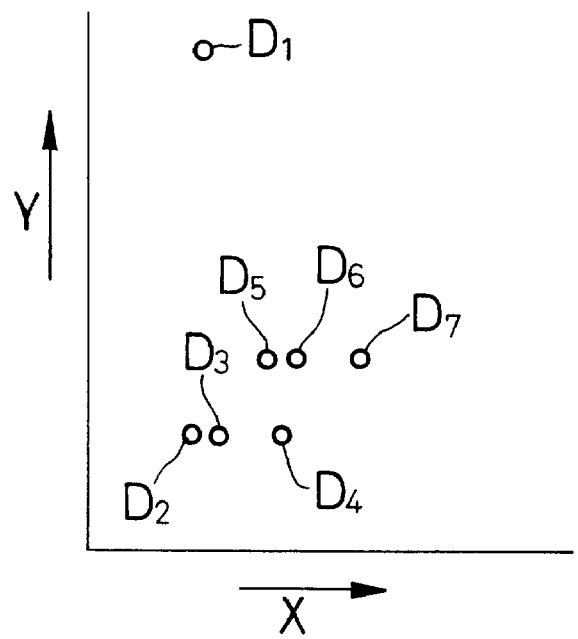
FIG. 6 is a diagram showing one example of the cell division by a cell dividing means according to a second embodiment of the present invention.
Figure 7:
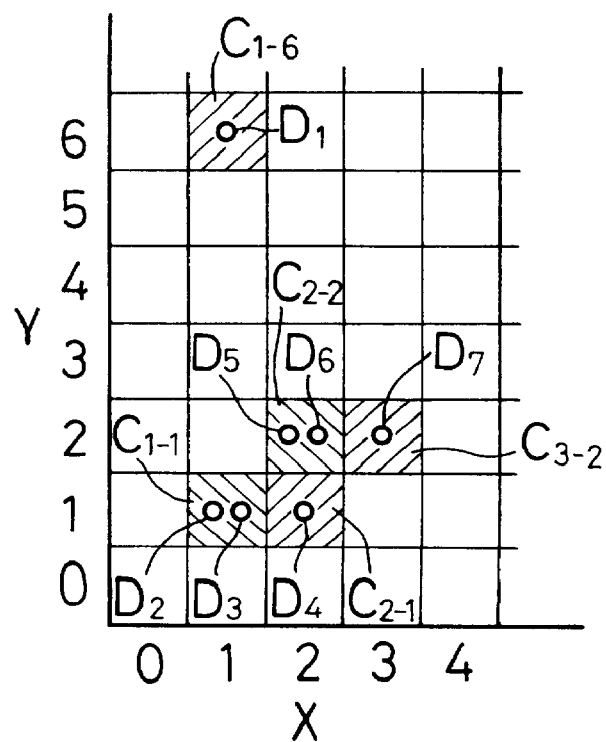
FIG. 7 is a diagram showing one example of the discernment by an object discerning means according to the second embodiment.
Figure 8:
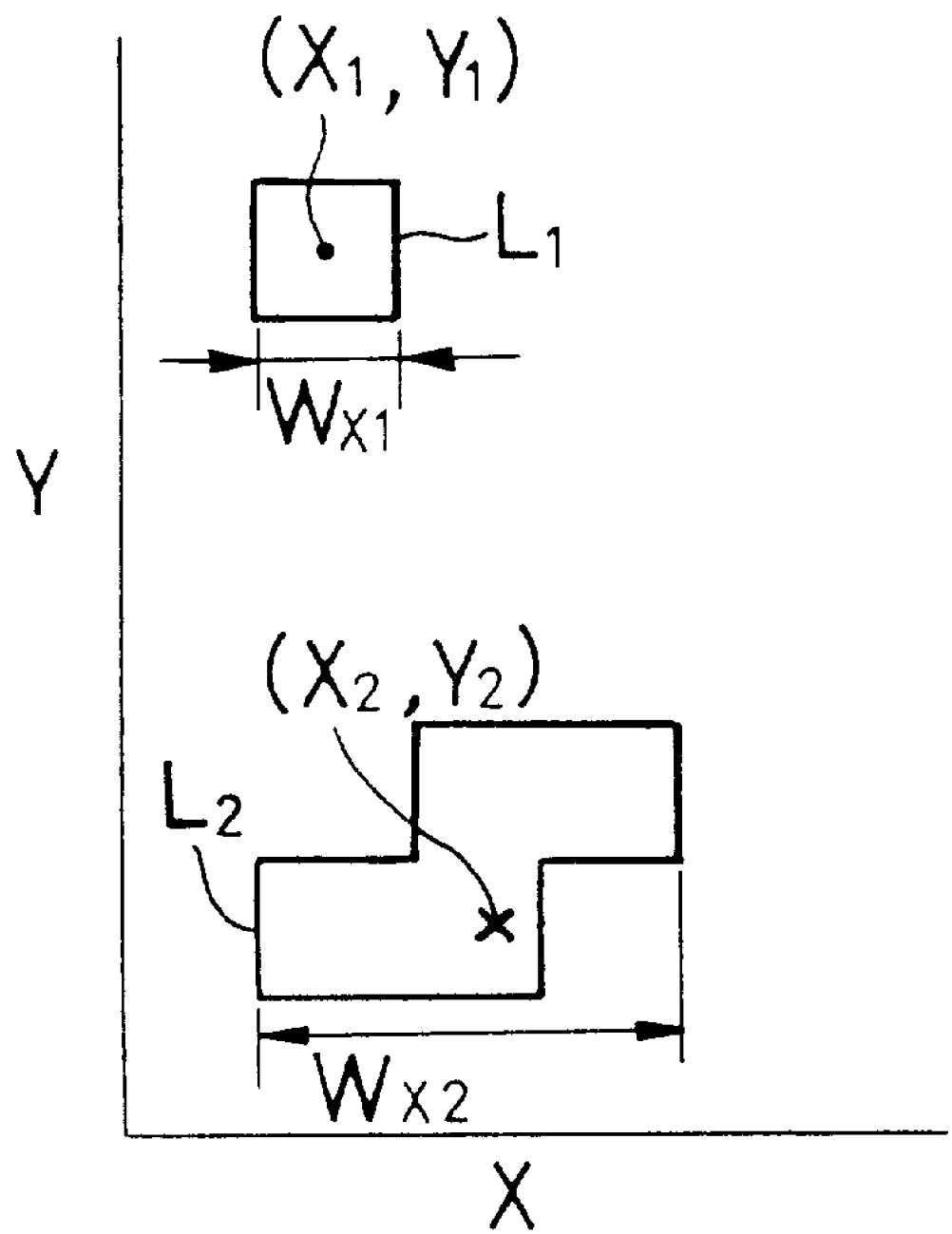
FIG. 8 is a diagram showing one example of the determination of the motion of an object by a motion determining means according to the second embodiment.

FIGS. 6 to 8 illustrate a second embodiment of the present invention. For example, seven data $D_1$, $D_2$, $D_3$, $D_4$, $D_5$, $D_6$ and $D_7$ are developed on the XY coordinates in the coordinate developing means 2 (see FIG. 1), as shown in FIG. 6. When the data $D_1$, $D_2$ and $D_3$, $D_4$, $D_5$ and $D_6$, and $D_7$ are located in the cells $C_{1-6}$, $C_{1-1}$, $C_{2-1}$, $C_{2-2}$ and $C_{3-2}$, respectively, the cell information for the cell $C_{1-6}$ is output as (1,6,1), the cell information for the cell $C_{1-1}$ is output as (1,1,2), the cell information for the cell $C_{2-1}$ is output as (2,1,1), the cell information for the cell $C_{2-2}$ is output as (2,2,2), and the cell information for the cell $C_{3-2}$ is output as (3,2,1) from the cell dividing means 3 (see FIG. 1).

In the object discerning means 4 (see FIG. 1), the same labels are affixed to the cells adjacent to one another, based on the cell information from the cell dividing means 3, and these cells are discerned as the same object. More specifically, when the cell information shown in FIG. 7 is input, in the object discerning means 5, an independent label $L_1$ is affixed to the cell $C_{1-6}$ in the vicinity of which no other cell having data exists as shown in FIG. 8. However, the same label is affixed to the cells $C_{1-1}$, $C_{2-1}$, $C_{2-2}$ and $C_{3-2}$ each having data and which are adjacent to one another. The discernment information of the label $L_1$ is of $(X_1, Y_1, Wx_1)$, and the discernment information of the label $L_2$ is of $(X_2, Y_2, Wx_2)$.

As for the label $L_1$ affixed to the cell $C_{1-6}$ whose cell information is identical to the cell information (1,6,1), $X_1$ is 1, and $Y_1$ is 6. However, for the labels $L_2$ affixed to the plurality of cells $C_{1-1}$, $C_{2-1}$, $C_{2-2}$ and $C_{3-2}$ which have been discerned as the same object, the X coordinate $X_2$ of a gravity center position is determined by dividing the sum total of the X coordinates of the cells $C_{1-1}$, $C_{2-1}$, $C_{2-2}$ and $C_{3-2}$ by the number of the data by the following equation:

$$X_2=(1\times2+2\times3+3\times1)/6=1.8$$

The Y coordinate $Y_2$ of the label $L_2$, i.e., the longitudinal distance from the subject vehicle to the object with the label $L_2$ affixed thereto is determined by selecting, from the plurality of output data $D_1$ to $D_7$ discerned as the same object, the preset N-number of the data from the longitudinally nearest one from the subject vehicle, and by averaging the longitudinal distances between the subject vehicle and each of the selected data. The preset number N is established as shown in Table below in accordance with the longitudinal distance from the subject vehicle and the number of the data.

|          | Number of data |        |          |          |          |
| Distance | 2–4      | 5–9      | 10–19    | 20–29    | 30–      |
|----------|----------|----------|----------|----------|----------|
| 0–10 m   | 2        | 3        | 7        | 15       | 25       |
| 10–20 m  | 2        | 3        | 7        | 17       | 27       |
| 20 m–    | all data | all data | all data | all data | all data |

Here, when the longitudinal distance is within a range of 1 to 20 m and the number of the data is six as shown in FIGS. 6 and 7, the preset number N is three. The three data are nearest three ones from the subject vehicle in the longitudinal direction, and are $D_2$, $D_3$ and $D_4$ in the example shown in FIG. 7. The data $D_2$, $D_3$ and $D_4$ are cell-divided in the cells $C_{1-1}$ and $C_{2-1}$. Therefore, the Y coordinate $Y_2$ of the label $L_2$ is determined by the following equation:

$$Y_2 = (1 \times 2 + 1 \times 1)/3 = 1$$

Specifically, the longitudinal distance $Y_2$ from the subject vehicle to the object with the label $L_2$ affixed thereto is determined by excluding the data $D_5$, $D_6$ and $D_7$ indicative of farther distance values, and by averaging the longitudinal distances of the nearest three data $D_2$, $D_3$ and $D_4$ from the subject vehicle.

The discernment information from the object discerning means 4 is input into the motion determining means 5 (see FIG. 1). In the motion determining means 5, the relative speed with respect to the subject vehicle, of the object with the label affixed thereto by comparison of a time series for every label discerned by the object discerning means 4, is determined, as in the first embodiment.

In the second embodiment, when the plurality of data output from the distance sensor 1 have been discerned as the same object, in detecting the longitudinal distance from the subject vehicle to the object, the preset N-number of the data are selected from the longitudinally nearest ones from the subject vehicle, and the longitudinal distances of the selected data are averaged. The resulting average value is determined as a longitudinal distance between the subject vehicle and the object. Therefore, the data of a low reception level and indicative of a farther distance value can be eliminated, whereby an affect due to data having a low reception level can be eliminated whereby the longitudinal distance to the object is detected relatively correctly.

Although the embodiments of the present invention have been described in detail, it will be understood that the present invention is not limited to the above-described embodiments, and various modifications in design may be made without departing from the spirit and scope of the invention defined in the claims.

What is claimed is:

1. An object detecting system for a vehicle, comprising:
   a distance sensor mounted on the vehicle and capable of detecting a distance between the subject vehicle and the object, which is located ahead of the subject vehicle, along longitudinal and lateral directions of the subject vehicle, based on transmission of a signal toward the object, which is ahead of the subject vehicle, and reception of a reflected signal from the object, so as to detect the object based on output data from the distance sensor;
   a coordinate developing means for associating said output data from said distance sensor on XY coordinates having a Y-axis indicative of a longitudinal direction and an X axis indicative of a lateral direction with respect to the subject vehicle;
   a cell dividing and counting means for dividing said XY coordinates in directions of the X and Y axes at predetermined distances into a plurality of cells of equal size, for counting a number of the output data located in each of the cells and for outputting the XY coordinates and the number of the data for every cell as cell information; and
   an object discerning means for assigning same identifiers to cells which are adjacent to one another and include therein data on said object, based on said cell information output from said cell dividing means and for determining X and Y coordinates of the barycentric positions for every identifier by the following equations:

$$X = (X1 \cdot N1 + X2 \cdot N2 + \ldots + Xn \cdot Nn)/N$$

$$Y = (Y1 \cdot N1 + Y2 \cdot N2 + \ldots + Yn \cdot Nn)/N$$

wherein X1, X2, . . . Xn denote X coordinates of cells in which data on said object are present, Y1, Y2, . . . Yn denote Y coordinates of said cells, N1, N2, . . . Nn denote the number of data in each cell, and N denotes the sum of the number of data present in the cells.

2. An object detecting system according to claim 1, wherein said cell information is represented by X coordinate, Y coordinate and number of data.

3. A object detecting system according to claim 1, wherein said object discerning means determines a width in said X-axis direction for every identifier.

4. An object system according to claim 3, wherein said object discerning means outputs discernment information represented as the barycentric position X-coordinate, barycentric position Y-coordinate and width in X-axis direction.

5. An object detecting system according to claim 4, further comprising motion determining means for determining relative speed of an object with respect to said vehicle.

6. An object detecting system according to claim 5, wherein a predicted range is defined ahead of a relative speed vector from each of the barycentric position coordinates obtained last time, and if barycentric position coordinates obtained this time are within the predicted ranges, the same object is determined.

7. An object detecting system according to claim 1, further comprising motion determining means for determining relative speed of an object with respect to said vehicle.

8. An object detecting system according to claim 7, wherein a predicted range is defined ahead of a relative speed vector from each of the barycentric position coordinates obtained last time, and if barycentric position coordinates obtained this time are within the predicted ranges, the same object is determined.

9. An object detecting system according to claim 1, wherein in calculating said Y coordinate of the barycentric position, a preset number of data is selected from data in said plurality of cells corresponding to said identifier and used for the calculation of the Y coordinate of the barycentric position.

10. An object detecting system according to claim 9, wherein said selected present number of data are closer to the subject vehicle than non-selected data.

* * * * *